(12) United States Patent
Kirchner et al.

(10) Patent No.: US 7,440,257 B2
(45) Date of Patent: Oct. 21, 2008

(54) DOUBLE-LAYER CAPACITOR, USE OF THE SAME, AND METHOD FOR INCREASING THE MAXIMUM CHARGES OF DOUBLE-LAYER CAPACITOR ELECTRODES

(75) Inventors: Edith Kirchner, Erlangen (DE); Harald Landes, Ruckersdorf (DE); Hartmut Michel, Heidenheim (DE); Barbara Schricker, Tennenlohe (DE); Andree Schwake, Heidenheim (DE); Christoph Weber, Heidenheim (DE)

(73) Assignee: EPCOS AG, Munich (DE)

( * ) Notice: Subject to any disclaimer, the term of this patent is extended or adjusted under 35 U.S.C. 154(b) by 207 days.

(21) Appl. No.: 10/531,135

(22) PCT Filed: Oct. 17, 2003

(86) PCT No.: PCT/DE03/03450

§ 371 (c)(1),
(2), (4) Date: Nov. 14, 2005

(87) PCT Pub. No.: WO2004/038742

PCT Pub. Date: May 6, 2004

(65) Prior Publication Data

US 2006/0098388 A1    May 11, 2006

(30) Foreign Application Priority Data

Oct. 18, 2002    (DE) .............................. 102 48 752

(51) Int. Cl.
    *H01G 9/00*    (2006.01)
(52) U.S. Cl. ..................................... 361/502; 29/25.03

(58) Field of Classification Search ................. 361/502, 361/503; 29/25.03
See application file for complete search history.

(56) References Cited

U.S. PATENT DOCUMENTS

| | | | |
|---|---|---|---|
| 4,630,176 A * | 12/1986 | Cuellar et al. ............... 361/502 |
| 5,841,627 A | 11/1998 | Prakash et al. |
| 5,953,204 A * | 9/1999 | Suhara et al. ............... 361/502 |
| 6,064,562 A | 5/2000 | Okamura |
| 6,201,686 B1 | 3/2001 | Hiratsuka et al. |
| 6,222,723 B1 | 4/2001 | Razoumov |
| 6,275,371 B1 * | 8/2001 | Yoshio et al. ............... 361/502 |
| 6,307,733 B1 | 10/2001 | Maruyama et al. |

FOREIGN PATENT DOCUMENTS

| | | |
|---|---|---|
| DE | 10003261 | 8/2000 |
| JP | 11-054380 | 2/1999 |

OTHER PUBLICATIONS

Siemens Data Book 1977/78 "Aluminium Electrolytic Capacitors" Best-Nr. B 1354. 101, S. 21-41.

(Continued)

*Primary Examiner*—Eric Thomas
(74) *Attorney, Agent, or Firm*—Fish & Richardson P.C.

(57) ABSTRACT

A double-layer capacitor includes a first electrode having a first polarity, a second electrode having a second polarity, the first polarity being different from the second polarity, and an electrolyte that is in contact with the first electrode and the second electrode. The first electrode has a first charge of the first polarity and the second electrode has a second charge of the second polarity, and maximum values of the first charge and the second charge are substantially equal.

21 Claims, 4 Drawing Sheets

OTHER PUBLICATIONS

Kötz R.et al "Principles and Applications of Electrochemical Capacitors" Electrochimica Acta, Elsevier Science Publishers, Barking, GB vol. 45, Nr. 15-16, pp. 2483-2498, XP004206798, ISSN 0013-4686.

Fries N. et al "UltraCap Double Layer Capacitors—A New Energy Storage Device for Peak Power Applications" Proceeding of the International Power Conversion Conference, Bd. 41, 2000 XP009028175 Nürnberg.

Conway B.E. et al. "The Role and Utilization of Pseudocapacitance for Energy Storage by Supercapacitors" Journal of Power Sources, Elsevier Sequoia S. A. Lausanne, CH, vol. 66, Nr. 1-2, pp. 1-14, XP004082296, ISSN:0378-7753.

Burke A. "Ultracapacitors: Why, How and Where is the technology" Journal of Power Sources, Elsevier Sequoia S. A. Lausanne, CH, vol. 91, Nr. 1, pp. 37-50, XP004214410, ISSN:0378-7753.

English Translation of Examination Report in Application No. 03775063.5, dated Apr. 13, 2007.

* cited by examiner

DOUBLE-LAYER CAPACITOR, USE OF THE SAME, AND METHOD FOR INCREASING THE MAXIMUM CHARGES OF DOUBLE-LAYER CAPACITOR ELECTRODES

BACKGROUND

Capacitors, such as double-layer capacitors, are also used in applications with high output requirements, because they can be implemented with high capacitances with simultaneously very low ESR. When used as temporary energy storage, for example, double-layer capacitors must emit or absorb, within relatively short periods of time of a few seconds or less, high currents and, associated with this, high energy. The operating voltages of double-layer capacitors generally amount to only a few volts. However, because applications usually require significantly higher voltages, multiple double-layer capacitors are frequently connected in series to form a capacitor battery. Because of the large number of individual capacitors, this means that constructing a capacitor battery is often very cost-intensive. For this reason, capacitors with the highest possible operating voltages are in demand. The later that critical corrosion currents are reached during charging of the capacitor, the higher its operating voltage. A high operating voltage requires a higher output density and energy density of the capacitor. The rated voltage of a capacitor is upwardly limited by the difference between the corrosion potentials of the capacitor electrodes and the electrolyte. If an electrode is at a potential within the corrosion range, electrochemical reactions can disadvantageously lead to corrosion of the electrodes or to disintegration of the electrodes, a process in which gas development can occur, significantly reducing the serviceable life of the capacitor. To avoid this, capacitors are generally used only at operating voltages at which the resulting individual electrode potentials remain outside the corrosion potential.

SUMMARY

It is known from the prior art that the maximum charge of a capacitor, which, advantageously, should be as large as possible, depends on its maximum operating voltage, that is, on the difference in the maximum potential that can be applied between the two electrodes of the capacitor.

Depending on the electrode system used, the individual double-layer capacitor electrodes, in the case of opposite polarity, that is, when connected as positively or negatively charged electrodes, can surprisingly absorb different maximum charge amounts. In this arrangement, the maximum absorbable charge is any charge amount that can be supplied to the electrode until the critical potential is reached. This electric characteristic of the electrode is referred to in the following as the maximum charge.

This effect is apparently attributable, on the one hand, to the different distances between the corrosion potentials of the electrodes and their resting potentials and, on the other hand, to the different behaviors of the anions and cations of the electrolyte solution in the electrochemical double layer. In this arrangement, the different volumes of the solvated, positively and negatively charged ions play as important a role as their mobility in the electrolyte solution and the charge number (valence) of the respective ions.

Figure 2A:
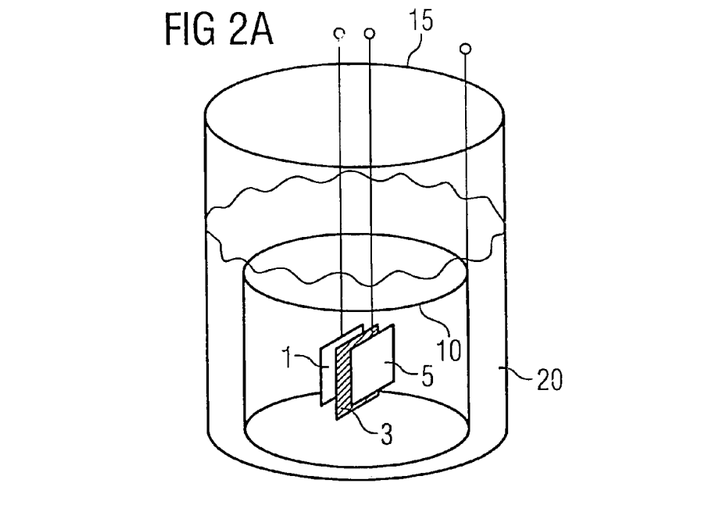
FIGS. 2A to 2C schematically show measurement arrangements for determining the potential-dependent charge of an electrode and the test curves obtained with the measurements, respectively.
Figure 2B:
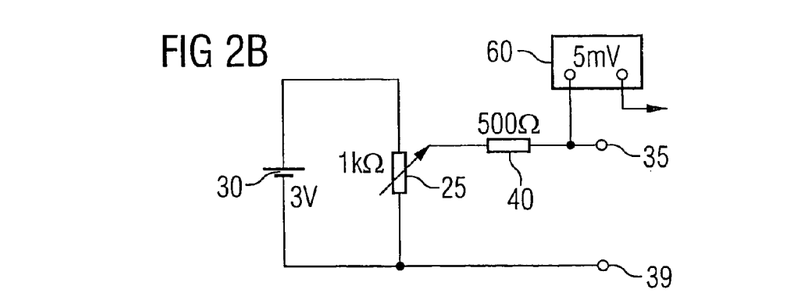
Figure 2C:
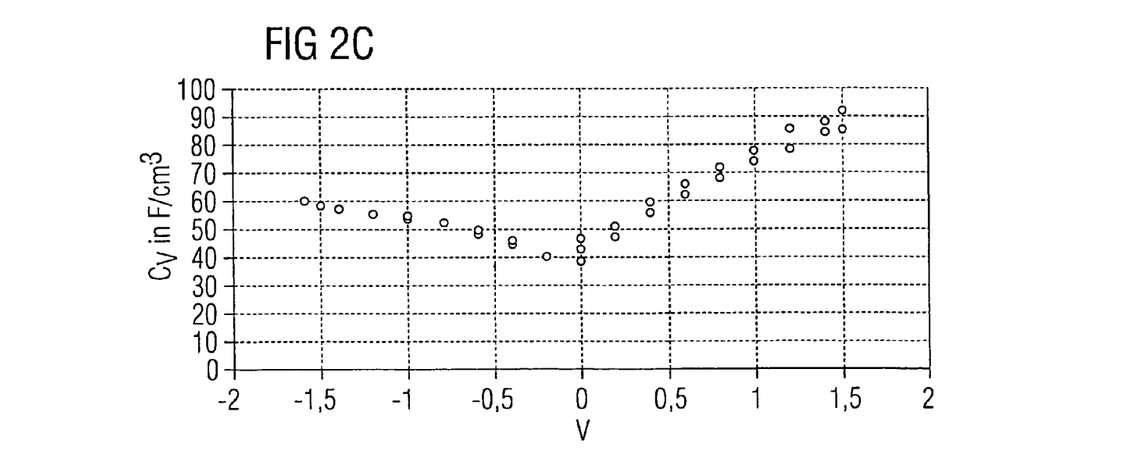

The effect of different maximum charges of the electrodes also occurs with oppositely charged electrodes that include the same electrode material and have the same dimensions (see FIG. 2C). The differences in the dependencies of the capacitance of the two oppositely charged electrodes on the applied potential means that the electrodes in a double-layer capacitor, in their charged state, have different potential distances from their resting potential. The reversibly exchangeable maximum charge of a double-layer capacitor depends solely on the difference in electrode potential in the charged state at which an electrode first reaches the corrosion potential. The second electrode, in this arrangement, is still removed from its corrosion potential, meaning that it could still absorb additional charge. As a result, the volume of material used for this second electrode does not have to be used entirely for energy storage. Because conventional, commercially obtainable double-layer capacitors usually contain electrodes that are made of the same electrode material and have the same dimensions, the energy densities of conventional double-layer capacitors and the amount of material required for each stored electric charge are therefore not optimal.

Different maximum charges of the electrode are not only affected by the polarity and the electrolyte, but also by the dimensions, the design, the mass as well as the surface area and surface structures of the electrodes. This leads to the possibility of matching the maximum charges of the electrode, which differ at the respective corrosion potential, which is not the case in conventional double-layer capacitors.

Described herein is a double-layer capacitor in which at least a first and second electrode are present, where both electrodes are in contact with an electrolyte. In the double-layer capacitor, the maximum charges, which are dependent on the polarity of the electrodes and determined relative to a reference electrode, are matched to one another. Electrodes include electron-conducting materials that are in contact with an electrolyte, with electrolytes including media that exclusively conduct ions.

In the double-layer capacitor, the amount of material used per stored electric charge is reduced.

In a conventional double-layer capacitor, the maximum charges of the individual electrodes, which are determined relative to a reference electrode, are not matched, because it was previously not known that the individual electrodes have different maximum charges that depend on the polarity of the electrode, the electrode material and the design. Thus, for example, conventional double-layer capacitor electrodes differ in terms of their charge, by 10% at a difference in potential of ±1 V relative to the resting potential and by 12% at a difference in potential of ±1.5 V. This effect results, for example, in a difference of at least 39% in the amounts of the individual potentials of the electrodes relative to the resting potential, at a capacitor voltage of 2.4 V.

The electrodes of a double-layer capacitor described herein have different capacitance-forming surface areas. This means that the maximum charges of the electrodes are matched to one another by using different electrode surface areas or different surface structures. The structure of the inner surface of an electrode determines the electrochemical double layer that forms in electrochemical double-layer capacitors during charging of the capacitor.

In addition, in a variant of a double-layer capacitor, in which the electrodes are made of the same electrode material, the masses of the respective electrodes can be different. This means that, in the case of the same electrode materials but different masses, such as in the case of electrodes with different layer thicknesses, the sizes of the inner surfaces of the electrodes are also different, resulting in maximum charges matched to one another.

In an embodiment of a double-layer capacitor, both electrodes of the capacitor have a charge Q, in the maximum charged state, which is indicated by the following equation:

$$Q = V^+ Q^+_{V\max} = V^- Q^-_{V\max} \text{ where}$$

$$Q^+_{V\max} = \int_0^{\varphi_+^{\max}} c_V(\varphi)\,d\varphi \text{ and}$$

$$Q^-_{V\max} = \int_0^{\varphi_-^{\max}} -c_V(\varphi)\,d\varphi = Q^-_{V\max}$$

wherein $Q^+_{Vmax}$ and $Q^-_{Vmax}$ are the respective maximum, volume-specific charge densities of the positive and negative electrodes, $V^+$ and $V^-$ the respective volumes of the positive and negative electrodes, $\phi$ is the electric potential, $\phi_-^{min}$ and $\phi_+^{max}$ are the electric potentials at which corrosion of the electrodes does not yet take place, and $c_v$ is the volume-specific, differential capacitance in the potential range valid for the respective electrode.

The products of the respective maximum volume-specific charge densities and the respective electrode volumes, that is, the maximum charges of both electrodes, are approximately equal, so that the material volume of both electrodes can essentially be used entirely for energy storage. The maximum, volume-specific charge densities $Q^+_{Vmax}$ and $Q^-_{Vmax}$ of the electrodes are also material-specific and indicate the same maximum charge per unit of volume of the electrode that can be supplied to the electrode without it reaching the corrosion potential. The critical charge densities and/or potentials can be determined by a person skilled in the art using leakage current measurements (see FIGS. 2A and 2B), for example.

In another variant of the double-layer capacitor, the two electrodes can be made of the same electrode material, wherein, in the maximum charged state of the capacitor, the product of the mass M+ or M− of the electrode and its critical, mass-specific charge density $Q^+_{M,max}$ and $Q^-_{M,max}$ is approximately equal for both electrodes:

$$Q = Q^+_{\max} = M^+ Q^+_{M,\max} = M^- Q^-_{M,\max} = Q^-_{\max} \text{ with}$$

$$Q^+_{M,\max} = \int_0^{\varphi_+} c_M(\varphi_+)\,d\varphi_+ \text{ and}$$

$$Q^-_{M,\max} = \int_0^{\varphi_-} c_M(\varphi_-)\,d\varphi_-$$

This means, as already described above, that the maximum charges of the two electrodes are approximately equal, so that the volume of material used for the electrodes can be used almost entirely for energy storage.

The term matching refers to adjusting the different maximum charges of the electrodes of a double-layer capacitor until the respective corrosion potentials are reached, in such a way that their difference is smaller than in conventional double-layer capacitors. That is, the difference is less than about 10% for standard operating voltages of about 2V, for example, and is less than about 12% for operating voltages of 3V.

The term matching, in this arrangement, can mean that, following determination of the maximum charges in the potential range that is negative relative to the reference electrode, using the measuring arrangement shown in FIG. 2A and 2B, for example, the maximum charge of those electrodes whose maximum charge was lower in the measurements is increased. As already described, increasing the charge can be achieved, for example, by increasing the mass or the volume, or by modifying the chemical composition of the electrode.

Double-layer capacitors which contain such matched electrodes have higher charge densities and elevated operating voltages when compared with conventional double-layer capacitors. In principle, however, it is also possible to reduce the maximum charge of those electrodes with the higher maximum charge, thereby matching them to the electrode with the lower maximum charge. This can be achieved by reducing the size of the surface of this electrode. If the electrode materials are the same, a reduction in the mass and/or volume of this electrode is also possible. Double-layer capacitors that contain such matched electrodes have higher operating voltages than conventional double-layer capacitors. Furthermore, because less electrode material is needed for one of the electrodes, these double-layer capacitors are less expensive than conventional capacitors, while nonetheless providing the same capacitor capacitance.

In electrodes with approximate equal maximum, potential-dependent charges, the changes can diverge from one another by up to 5%. This divergence is attributable, among other things, to measuring errors during determination of the maximum charge, which generally do not permit an exact determination of this variable.

In double-layer capacitors, one of the electrodes can comprise carbon. Carbon electrodes bring about charge storage primarily through their large inner surface. The electrode material can be selected from a group of the following materials:

a) carbon powder,
    b) carbon fibers, e.g., fabric, nonwoven fabric, paper or strands,
    c) de-metallized metal carbides,
    d) carbon aerogels,
    e) graphitic carbon,
    f) nanostructured carbon,
    g) carbon applied by physical vapor deposition (PVD) and/or chemical vapor deposition (CVD).

Carbon powder electrodes, which include, for example, carbon powder applied to aluminum foil, are especially advantageous, because it is especially easy to vary their layer thickness on the aluminum foil. In this manner, it is especially easy to implement electrodes which, due to different thickness, for example, have approximately the same maximum charges. A large range of fabrics, for example, having, for example, different weaving structures, material thickness and material density, can be used as carbon fibers. Nonwoven fabrics or papers can also be used. Depending on their structure, carbon fibers have different volume-specific capacitances, different voltage stabilities and gassing tendencies. Carbon electrodes with a large surface can also be produced by removing metallic components from metal carbides (de-metallized metal carbides), for example. SiC or TiC, for example, may be used as metal carbides.

Carbon aerogels are monolithic, open-pore solid bodies with a large inner surface (more than 1500 m²/g, determined using the BET method), whose structural parameters during production in a sol-gel process can be varied within a wide range.

Also in the case of carbon electrodes comprised of graphitic carbon, very high volume-specific capacitances can be achieved in that, for example, the graphitic carbon, coke, for example, which can be derived from tar or petroleum, is baked with a base, such as potassium hydroxide, at high temperatures of approximately 700 to 850°. During this process, the structure of the carbon is opened, also resulting in a very large surface, which can be used for electrostatic charge storage.

Nanostructured carbon exists in the form of so-called nanofilaments, which typically have a diameter in the nanometer range and lengths in the micrometer range.

Carbon electrodes with large surfaces can also be produced by precipitating carbon out of the gas phase by, for example, Chemical Vapor Deposition (CVD). Ionized carbon particles can be applied in an electric field by Physical Vapor Deposition (PVD).

It is also possible that at least one of the electrodes of a double-layer capacitor be selected from a group consisting of conductive polymers, such as polyaniline, conductive ceramics, such as titanium nitride, and metals or metal alloys, and has a large surface.

The electrolyte of a double-layer capacitor can comprise a gel electrolyte and/or polymer electrolyte. It is also possible that the electrolyte is an electrolyte solution comprising organic and/or aqueous solvents, in which case a separator is additionally arranged between the electrodes, said separator comprising, for example, paper, a polymer membrane or glass fibers.

Double-layer capacitors that encompass different electrodes can also be implemented as a stack layer. In this case, both electrodes are structured as layers, the layered stack encompassing alternating first and second electrode layers with separators disposed between the layers. The separators and the electrodes are soaked in an electrolyte solution.

It is also possible to roll the first and second electrode, which are structured as a layer, along with separators disposed between them, into a capacitor coil. In the case, for example, of carbon electrodes applied to an aluminum foil, the electrodes are contacted by protruding sections of the aluminum foil. Instead of circular coils, flat coils with rectangular shapes are also possible.

In another variant, the double-layer capacitors can also comprise pseudo-capacitors, in which case both electrodes comprise either metal oxides or conductive polymers. The metal oxide can, for example, comprise ruthenium oxide, iridium oxide or nickel oxide, and the electrically conductive polymer can, for example, comprise polypyrrol, polythiophene or polyaniline, or derivatives of these conductive polymers. In the case of pseudo-capacitors, pseudo-capacitances develop on the surface of the electrodes as a result of the movement of electric charges generated by oxidation and reduction processes at the electrodes.

Double-layer capacitors can also be used in capacitor batteries. The advantage of capacitor batteries comprised of the capacitors described herein is that they are made of significantly fewer individual capacitors, because the capacitors described herein have higher operating voltages than conventional capacitors.

Also described herein is a method for reducing the difference between the different maximum charges of a first and a second double-layer capacitor electrode with opposite charge. The method includes:
A) the corrosion-free potential window of the electrode material, as measured against a reference electrode, is determined;
B) the maximum charges, as measured against a reference electrode, of the electrode materials of the first and second electrode are determined and then, in step
C) the maximum charges of the two electrodes are matched.

In step A), a difference in potential between the first electrode and the reference electrode can be set, followed by measurement of the corrosion current. The allowable potential range is exceeded where this current exceeds a critical limit value, such as 10 μA/cm². Then, in step B), the electrode is brought to the critical potential within a short period of time, such as 1 minute, and the charge needed for this purpose is determined by integration of the current. This process is then repeated on the other end of the allowable potential range. This measurement can be performed either with the same electrodes or with electrodes made of a different material.

In step C), the surface area of the electrode that is to operate later on in the double-layer capacitor on the side of the allowable potential window that has the lower maximum, potential-dependent charge density is elevated, for example. This has the result that the maximum voltage and the total capacitance of a double-layer capacitor containing electrodes matched to one another via this method are higher than in a conventional double-layer capacitor.

The charge densities of the first and second electrode determined at the positive and at the negative edge of the corrosion-free potential window are used to calculate the volume or mass ratio of both electrode according to the following equation and, by modifying the mass and/or volume, matching them to one another:

$$\frac{M^+}{M^-} = \frac{Q^-_{M,max}}{Q^+_{M,max}} \text{ and/or } \frac{V^+}{V^-} = \frac{Q^-_{V,max}}{Q^+_{V,max}}$$

In another advantageous variant of the method, the same electrode material and the same design and dimensions are used for the first and second electrode in steps A) and B). Then, in step C), the mass or the volume of those electrodes with the lower critical charge is increased. An increase in the mass or volume means that, while the electrode materials and the dimensions remain the same, the surface area of the electrode increases, thereby raising the critical charge.

In another advantageous variant of the method, in step C), the product $$Q_{V,max}^+ V^+ = Q_{V,max}^- V^- \text{ and/or } Q_{M,max}^+ M^+ = Q_{M,max}^- M^-$$

is set to be approximately equal for both electrodes. If this product is approximately equal, the maximum charges of the two electrodes are also approximately equal. In this case, the total capacitance and the operating voltage of a double-layer capacitor containing these electrodes are at a maximum.

In the following, exemplary embodiments and figures are described.

DETAILED DESCRIPTION

Figure 1:
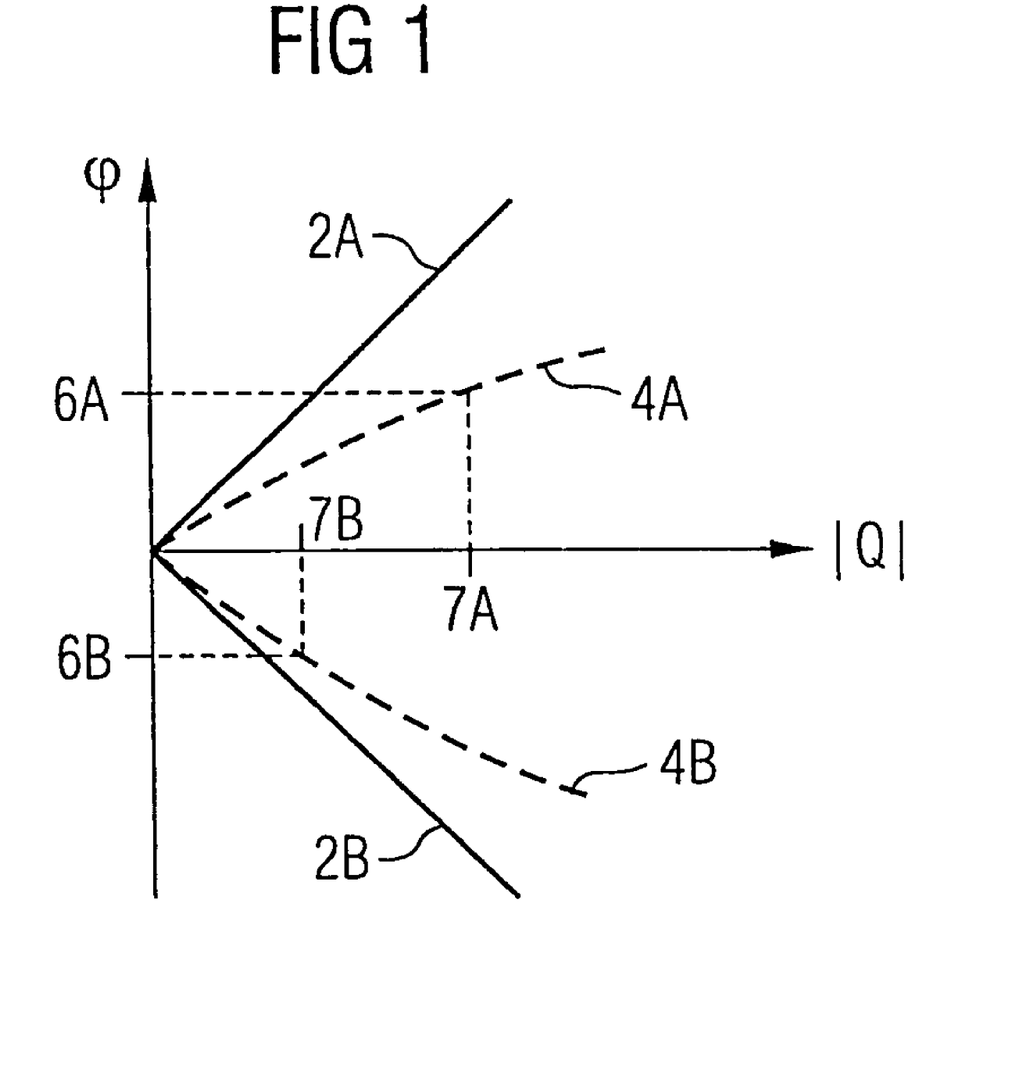
FIG. 1 shows, in model form, the dependency of the potential on the charge.

FIG. 1 shows, in model form, the dependency of the potential φ on the charge Q. In the case of a classic plate capacitor, in which, for example, two flat printed circuit boards, as electrodes, are separated by a dielectric, such as air, both positive potentials (i.e., for the positive electrode, and negative potentials) for the negative electrode result in a linear progression 2A or 2B, with the capacitance being constant in each case.

In a double-layer capacitor, electron-conducting materials (electrodes) are in contact with ion-conducting materials (electrolytes), which, in reality, results in the schematic dependencies of the potential $\phi$ on the charge Q identified as 4A and 4B, for example. It is evident that the respective dependency of the charge on the potential for positive and negative potentials has different and, in particular, non-linear progressions, so that the capacitance is dependent on the potential. In the double-layer capacitor, the contact between the electron conductor and the electrolyte furthermore leads to corrosion phenomena, which are dependent on potential and can result in destruction of the components. The different magnitudes of the positive and negative critical corrosion potentials 6A and 6B, respectively, in FIG. 1 result in different projections 7A and 7B on the Q axis. These represent the respectively different maximum charges of the electrode at their critical corrosion potentials. A double-layer capacitor should be operated in such a way that charging ends as soon as one of the two electrodes has reached its corrosion potential (that is, the negative electrode has reached the negative corrosion potential and the positive electrode the positive corrosion potential). The charges of both electrodes are always oppositely equal and, with respect to magnitude, exactly equal to the charge supplied to the capacitor by the external current circuit. Because of the potential dependency of the electrode capacitance described above and the non-oppositely equal distances of the corrosion potentials from the potential of the as yet uncharged electrode, one of the electrodes will usually reach its corrosion potential earlier than the other, so that the charging process must be terminated to prevent corrosion. The second electrode is then still at a distance from its corrosion potential and could thus absorb an additional charge. As a result, the volume of material used for this electrode cannot be fully used for energy storage. Thus, the energy density of the double-layer capacitor and the amount of material used per stored electric charge are not optimal.

The fact that, therefore, the maximum potential difference between the electrodes, which is usable in principle, cannot be utilized leads to another disadvantage. The maximum charge voltage of the double-layer capacitor is smaller than the maximum possible value determined by the difference between the critical electrode potentials. Because the operating voltage of a double-layer capacitor cell lies at only a few volts, whereas the applications generally require higher voltages, it is of interest to choose the highest possible voltage for the individual cell, so that the smallest possible number of cells have to be connected in series to achieve the target voltage.

Parameters that can be modified to match the maximum charges of the electrodes are the surface characteristics of the electrodes, such as their capacitive active surface, which is determined by, among other things, the porosity and the particle size of the material, the corrosion stability of the electrodes and the charge eliminator, and the chemical composition of the electrolyte, e.g., valence and ion radii.

FIG. 2A shows, in schematic form, a test setup for determining the potential-dependent charge. It is evident that a reference electrode 10, comprised, for example, of a coiled carbon fabric electrode, is introduced into a measuring cell 15 that contains an electrolyte solution 20. In this arrangement, aluminum is applied, via a spray process, for example, to the carbon fabrics. The first electrode 1 and the second electrode 5, the maximum charges of which are to be determined, are separated from one another by a separator 3. The voltage between the first and the second electrode was set to 0 V.

Subsequently, a difference in potential is set between the electrode 1 and the reference electrode 10. Using the circuit array shown in FIG. 2B, and with the aid of a voltage divider 25, it was possible to set the difference in potential to any value within a range of 0 to 3 V, for example. A battery, for example, was used as a DC voltage source 30. The reference electrode 10 and the electrode 1 are integrated into the circuit array of FIG. 2B at the test points 39 or 35. Using a frequency response analyzer 60, an AC voltage of 5 mV, for example, is applied between the first electrode 1 and the second electrode 5, which is connected at 41 in FIG. 2B. The voltage multiplier 40 in the circuit array of FIG. 2B ensures that the resulting current response flows through the cell formed by electrodes 1 and 5 and does not escape through the voltage divider 25 and the battery.

Following stabilization of the difference in potential between the reference electrode and the electrode 1 after 1 to 2 hours, an impedance measurement between electrodes 1 and 5 was performed at a small amplitude of about 5 mV, in order to measure the differential capacitance of the cell formed by electrodes 1 and 5. Electrode 5 apparently has the same potential relative to the reference electrode as electrode 1, because electrodes 1 and 5 only differ by the small AC voltage of 5 mV applied for the purpose of measuring impedance. Using different settings on the voltage divider 25, it was possible to determine the potential-dependent capacitance of the electrode 1 at various negative differences in potential between the electrode and the reference electrode. After the polarity of the battery had been reversed, it was possible to use the same approach to measure the capacitance of the electrode in the case of a positive difference in potential relative to the reference electrode. In this arrangement, the reference electrode 10 remains at resting potential, because it has a significantly larger surface area than the two other electrodes 1 or 5 (1.2 cm$^2$ for the first and second electrode, for example, and about 100 cm$^2$ for the reference electrode, for example). The electrolyte was stirred during the measurements using a floating stirrer, so that the concentration gradient possibly forming in the electrolyte could equalize more quickly. The distance between the first and second electrode was, for example, about 28 μm, and the amount of electrolyte was, for example, about 30 ml. In the measurements, a solution of 0.5 to 1.5 M tetraethylammonium tetrafluoroborate $(C_2H_5)_4NBF_4$ in 100% acetonitrile was used as the electrolyte. The two first and second electrodes 1, 5 were dried prior to measurement.

FIG. 2C shows a measurement curve obtained by the measurement arrangement outlined in FIGS. 2A and 2B. The differential, potential-dependent capacitance, in F/cm$^3$, is plotted against the difference in potential between the cell formed by electrodes 1 and 5 and the reference electrode 10. The positive differences in potential between this cell and the reference electrode are plotted to the right of the origin on the x axis and the negative differences in potential to the left of the origin on the x axis. It is evident that the capacitance progressions differ between positive and negative potential. This property is attributable to the different behaviors of the anions and cations of the electrolyte in the electric field. The different volumes of the solvated positively and negatively charged ions, i.e., tetraethylammonium cations and tetrafluoroborate anions, in the case of the electrolyte solution described above, play as important a role as their mobility in the electrolyte solution and in the pores of the electrodes, as do the charges of the ions. In the case of FIG. 2C, the electrodes 1 and 5, as well as 10, include an aluminum foil with a thickness of about 30 µm, for example, to which the activated charcoal powder was applied in a thickness of about 100 µm. The density of the carbon layers of the electrodes 1 and 5 was approximately 0.71 g/cm$^3$. Thus, FIG. 2C clearly shows that even electrodes made of the same electrode material and having the same design and dimensions exhibit different differential, potential-dependent capacitances when they have opposite polarity. A carbon fabric electrode with a larger surface area than the working electrodes was used as the reference electrode.

Figure 3A:
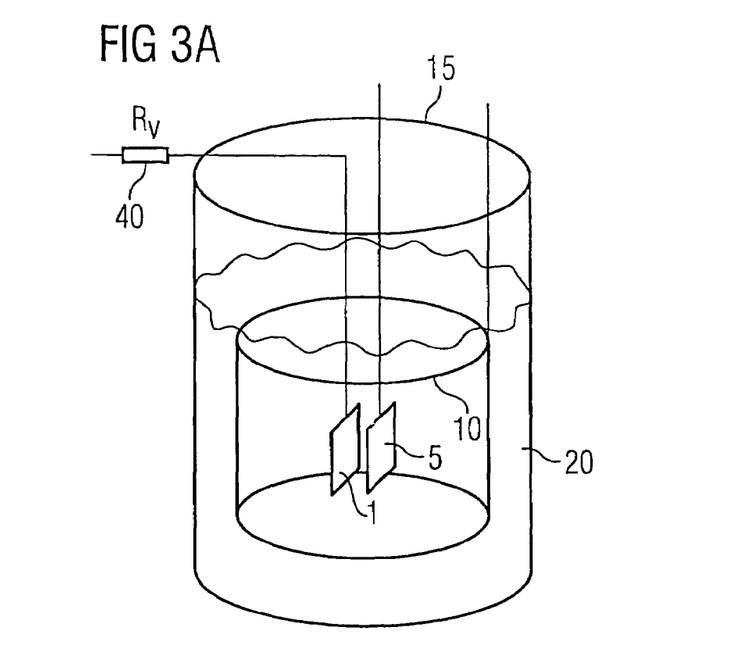
FIGS. 3A and 3B show a schematic test setup for leakage current measurement and a measurement curve obtained by the test setup.

FIG. 3A shows, schematically, a test setup for determining the leakage current that flows through the electrolyte between electrodes 1 and 5 when a specific difference in potential is set between the reference electrode 10 and the first electrode 1, as the working electrode. The purpose of the leakage current measurements is to discover the positive and/or negative limits in potential, up to which an electrode can be maximally charged. They are also used to determine the critical charge density already described earlier. This is defined as the maximum charge, per volume or mass of the electrode that can be supplied to the electrode without it reaching the corrosion potential. At the corrosion potential, electrochemical processes occur at the electrode that impair the serviceable life of the electrode and, for example, can lead to decomposition of the electrolyte, along with gas formation. Thus, the critical charge density indicates, in a manner of speaking, the maximum charge that can be supplied per volume or mass of the electrode.

Between the working electrode 1 and the reference electrode 10, such as the carbon fabric electrode mentioned above, the voltage, beginning at 0 V, is increased incrementally and kept constant for a period of approximately 3 hours at each increment. The leakage current flowing through the electrolyte, between the working electrode 1 and the counter-electrode 5, is determined. To obtain a noise-free test signal, a voltage multiplier 40 (approximately 500Ω) is connected ahead of the test setup 15. The potential of the counter-electrode relative to the reference electrode was recorded using an additional digital voltmeter. The surface area of both the working electrode and the counter-electrode was about 1 cm$^2$, while that of the reference electrode was, once again, about 100 cm$^2$. The distance between the working electrode and counter-electrode was about 1 cm. The measurement was performed in the above-mentioned electrolyte at room temperature. The electrolyte volume was approximately 30 ml. The working electrode, the counter-electrode and the reference electrode was heated in a vacuum at 90° C. prior to the measurement.

Figure 3B:
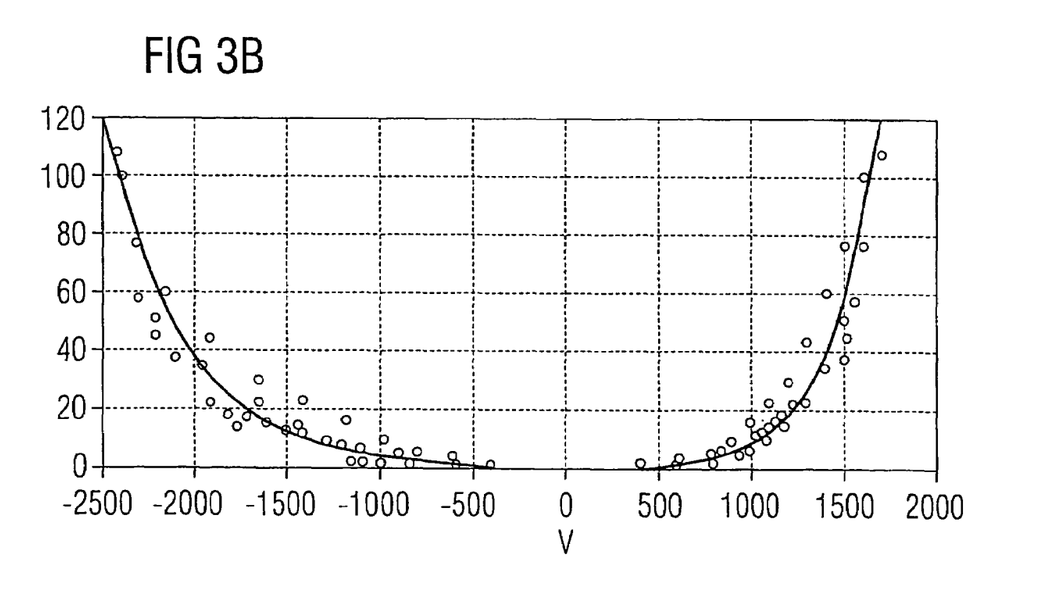

FIG. 3B shows a measurement curve obtained via the leakage current measurement mentioned above. In this arrangement, the leakage current is plotted as a factor of the difference in potential between the working electrode 1 and the reference electrode 10.

Figure 4:
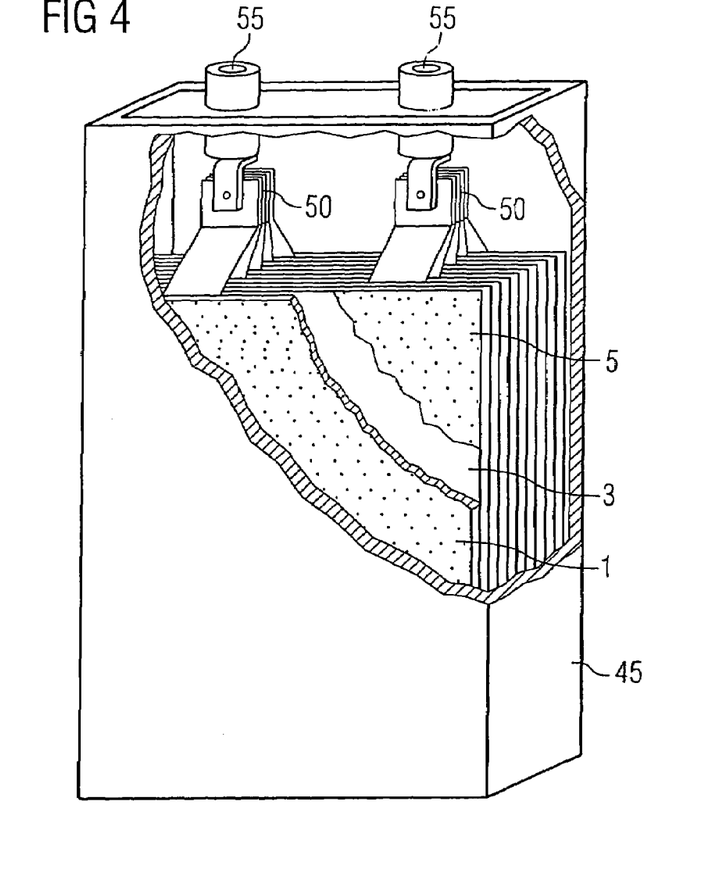
FIG. 4 shows a possible variant of a double-layer capacitor.

FIG. 4 shows a possible variant of a double-layer capacitor, which comprises a layer stack comprised of alternating first electrode layers 1 and second electrode layers 5, with separators 3 disposed between the layers. In a double-layer capacitor, the maximum charges of the first and the second electrode layer, given the same electrode materials, are adjusted by using different thicknesses of the electrode layers 1, 5. Electrode terminals 55 located on the housing 45 of the double-layer capacitor can be contacted by way of protruding small metal bands 50.

Figure 5:
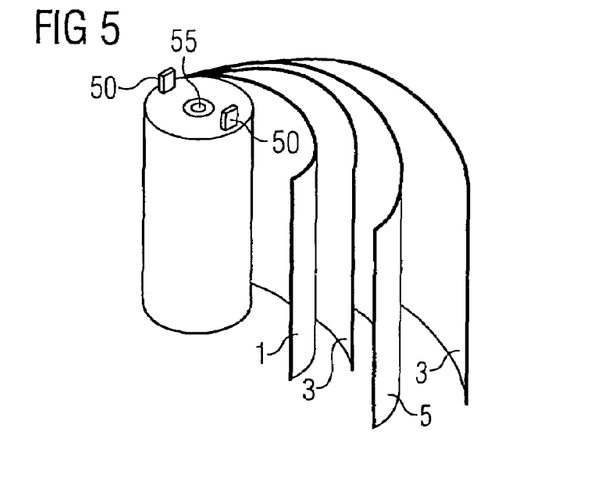
FIG. 5 shows a capacitor coil as an additional exemplary embodiment of a double-layer capacitor.

FIG. 5 shows another possible embodiment of a double-layer capacitor in the form of a capacitor coil. In this case, a first electrode layer 1, a separator 3 as well as the second electrode layer 5 are coiled around a core tube or mandrel, which, after being removed, leaves the hole 55. In this embodiment of the double-layer capacitor, the respective electrode layers can also be contacted via protruding small metal bands 50 and, for adjustment of the maximum charges, have, for example, different thicknesses with identical electrode material.

The claims are not limited to the exemplary embodiments described here. Other variations are possible, both with respect to the design of the electrodes and with respect to the structural shape of the capacitor. In this case, a matching of the maximum charges always occurs for a specific electrolyte, because different electrolytes cause different maximum charges and can thus require different measures for matching.

The invention claimed is:

1. A double-layer capacitor comprising:
a first electrode having a first polarity;
a second electrode having a second polarity, the first polarity being different from the second polarity; and
an electrolyte that is in contact with the first electrode and the second electrode,
wherein the first electrode has a first charge of the first polarity and the second electrode has a second charge of the second polarity, and wherein maximum values of the first charge and the second charge are substantially equal.

2. The double-layer capacitor of claim 1, wherein the first and second electrodes have first and second surfaces, respectively, the first and second surfaces being different.

3. The double-layer capacitor of claim 2, wherein the first and second surfaces have different sizes.

4. The double-layer capacitor of claim 2, wherein the first and second surfaces comprise a same type of material, and wherein the first and second surfaces have different masses.

5. The double-layer capacitor of claim 1, wherein a product of $$Q_{V,max}^+ V^+ = Q_{V,max}^- V^-$$

is approximately equal for the first and second electrodes, where Q corresponds to electrode charge and V corresponds to electrode volume.

6. The double-layer capacitor of claim 1, wherein the first electrode and second electrode comprise a same type of electrode material; and
wherein a product of $$Q_{M,max}^+ M^+ = Q_{M,max}^- M^-$$

is approximately equal for the first and second electrodes, where Q corresponds to electrode charge and M corresponds to electrode mass.

7. The double-layer capacitor of claim 1, wherein at least one of the first and second electrodes comprises carbon.

8. The double-layer capacitor of claim 1, wherein at least one of the first and second electrodes comprises one material selected from the group consisting of: carbon powder, carbon fabrics, de-metallized metal carbides, carbon aerogels, graphitic carbon, nanostructured carbon, and physical vapor deposition (PVD) and/or chemical vapor deposition (CVD) carbon.

9. The double-layer capacitor of claim 1, wherein at least one of the first and second electrodes comprises one material selected from the group consisting of a conductive polymer, a conductive ceramic, a metal, and a metal alloy; and
wherein the first and second electrodes have differently sized surfaces.

10. The double-layer capacitor of claim 1, wherein the electrolyte comprises one material selected from the group consisting of a gel electrolyte, a polymer electrolyte, and a liquid gel electrolyte.

11. The double-layer capacitor of claim 1, wherein the electrolyte comprises a solution comprising one material selected from the group consisting of organic and/or aqueous solvents; and wherein the double-layer capacitor further comprises:
a separator between the first and second electrodes.

12. The double-layer capacitor of claim 11, wherein the separator comprises paper, polymer membranes, or glass fibers.

13. The double-layer capacitor of 1, wherein the first and second electrodes are stacked; and wherein the double-layer capacitor comprises at least one separator between the first and second electrode layers.

14. The double-layer capacitor of claim 13, wherein the stack defines a coil.

15. A pseudo-capacitor comprising the double-layer capacitor of claim 1;

wherein the at least one of the first and second electrodes comprises metal oxide or conductive polymer.

16. A capacitor battery comprising the double-layer capacitor of claim 1.

17. A method of reducing a difference between maximum charges of a first electrode and a second electrode of a double-layer capacitor, the first and second electrodes comprising an electrode material, the method comprising:

obtaining a non-corrosion potential range of the electrode material relative to a reference electrode;

obtaining maximum charges of the first and second electrodes relative the reference electrode, the maximum charges being within the non-corrosion potential range; and adjusting the maximum charges so that the maximum charges are closer in magnitude.

18. The method of claim 17, wherein obtaining the non-corrosion potential range comprises:

obtaining a potential difference between the first and second electrodes and the reference electrode; and measuring a corrosion current between the first electrode and the second electrode at the potential difference; and wherein obtaining the maximum charges comprises integrating current into the first electrode.

19. The method of claim 17, wherein adjusting comprises increasing a size of a surface of an electrode having a lowest maximum charge.

20. The method of claim 17, wherein the first and second electrodes comprise a same material and have same dimensions when the non-corrosion potential range is obtained and when the maximum charges are obtained; and wherein adjusting comprises increasing a mass of an electrode having a lowest maximum charge.

21. The method of claim 17, wherein, during adjusting, a product of $$Q_{V,max}^+ V^+ = Q_{V,max}^- V^- \text{ or } Q_{M,max}^+ M = Q_{M,max}^- M^-$$

is approximately equal for the first and second electrodes, where Q corresponds to electrode charge, V corresponds to electrode volume, and M corresponds to electrode mass.

* * * * *